United States Patent [19]
Dove et al.

[11] Patent Number: 5,938,765
[45] Date of Patent: Aug. 17, 1999

[54] SYSTEM AND METHOD FOR INITIALIZING A MULTINODE MULTIPROCESSOR COMPUTER SYSTEM

[75] Inventors: Kenneth Frank Dove, Tigard, Oreg.; Darin Jon Perrigo, Seattle, Wash.; Robert Bruce Gage, Beaverton, Oreg.

[73] Assignee: Sequent Computer Systems, Inc., Beaverton, Oreg.

[21] Appl. No.: 08/924,038

[22] Filed: Aug. 29, 1997

[51] Int. Cl.$^6$ ...................................................... G06F 9/445
[52] U.S. Cl. .................................. 713/1; 713/2; 713/100
[58] Field of Search .................................... 395/651, 652, 395/653, 500, 311, 750.07, 700.52

[56] References Cited

U.S. PATENT DOCUMENTS

| | | | |
|---|---|---|---|
| 5,404,527 | 4/1995 | Irwin et al. | 395/700 |
| 5,802,333 | 9/1998 | Melvin | 395/311 |
| 5,802,578 | 9/1998 | Lovett | 711/147 |
| 5,809,329 | 9/1998 | Lichtman et al. | 395/828 |

OTHER PUBLICATIONS

"Hypercube Concurrent Computers and Applications," vol. 1, pp. 843–846, Jan. 19–20, 1988, Pasadena, CA.

"ACPI Implementers' Guide," Intel/Microsoft/Toshiba, pp. 91–101, Feb. 1, 1998.

"Advanced Configuration and Power Interface Specification," Intel/Microsoft/Toshiba, Revision 1.0a, pp. 168–221 (1988).

"A Reference for Designing Servers and Periferals for the Microsoft® Windows NT® Server Operating System," *Hardware Design Guide Version 2.0 for Microsoft Windows NT Server*, Intel Corporation and Microsoft Corporation (1997–1998).

"Pentium® Pro Processor BIOS Writer's Guide," Version 2.0, Intel (1996).

"Multiprocessor Specification," Version 1.4, Intel (1993–1997).

"Firmware Support for Reliable Communication and Dynamic System Configuration in System Area Networks," Bilas et al., Princeton University Technical Report TR–581–98, pp. 1–9 (1998).

*Primary Examiner*—Ayaz R. Sheikh
*Assistant Examiner*—Tim Vo
*Attorney, Agent, or Firm*—Klarquist Sparkman Campbell Leigh & Whinston, LLP

[57] ABSTRACT

An apparatus and method for initializing a shared-memory, multinode multiprocessor computer system. The nodes in the multiprocessor computer system separately and independently run standard PC-based BIOS routines in parallel for initialization of the nodes. These BIOS routines set addresses of hardware components on each node as though the nodes are in a single-node environment. After completion of BIOS, the addresses of the hardware components are reprogrammed to conform with the multinode environment. A master processor then takes control to boot the operating system on the multinode environment.

20 Claims, 8 Drawing Sheets

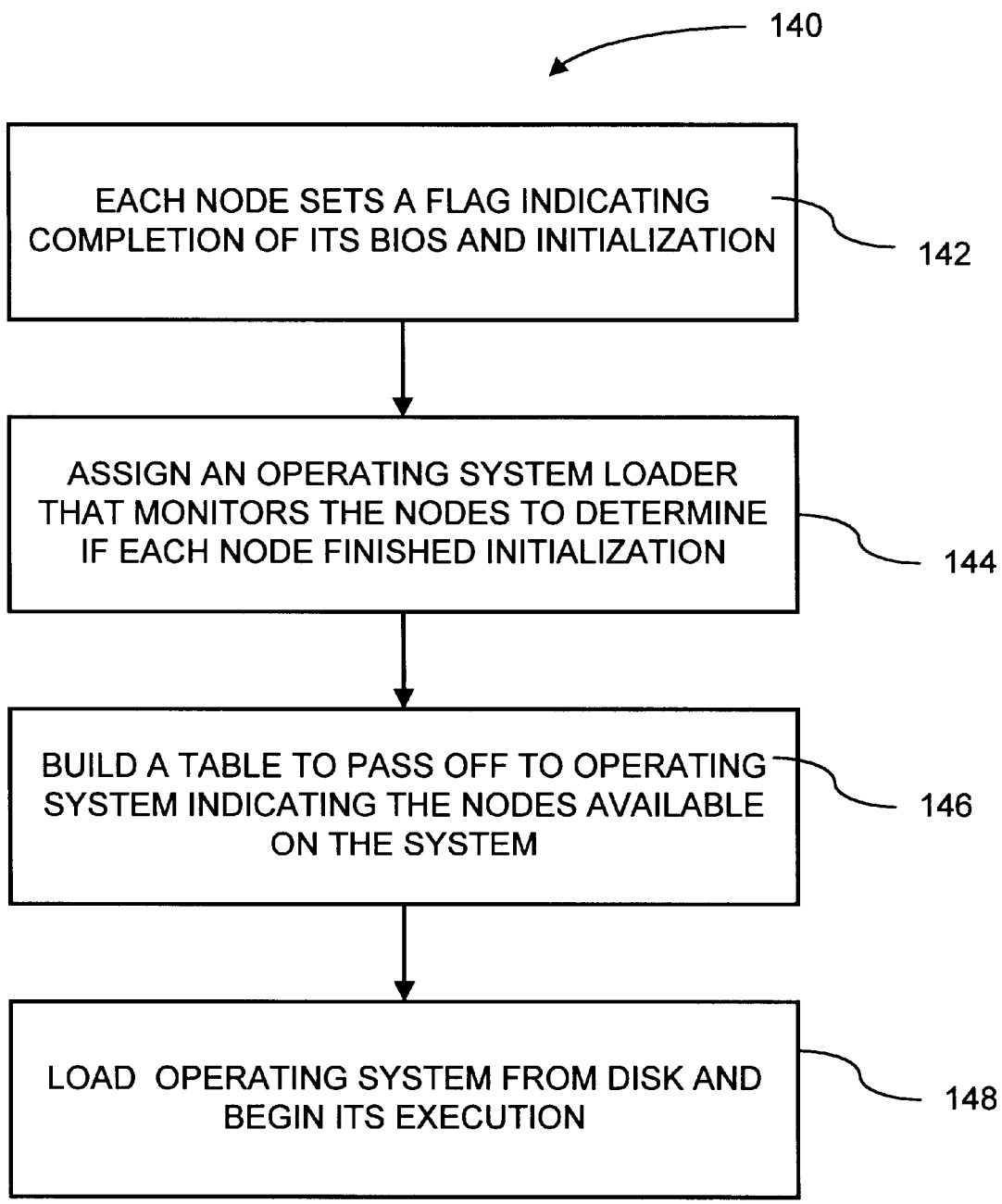

SYSTEM AND METHOD FOR INITIALIZING A MULTINODE MULTIPROCESSOR COMPUTER SYSTEM

FIELD OF THE INVENTION

This invention relates generally to a computer system with multiple processors located on a plurality of nodes. More particularly, this invention relates to initializing or booting such a multiprocessor system.

BACKGROUND OF THE INVENTION

Multiprocessor computers by definition contain multiple processors that can execute multiple parts of a computer program or multiple programs simultaneously. In general, this parallel computing executes computer programs faster than conventional single processor computers, such as personal computers (PCs), that execute the parts of a program sequentially. The actual performance advantage is a function of a number of factors, including the degree to which parts of a program can be executed in parallel and the architecture of the particular multiprocessor computer at hand.

Multiprocessor computers may be classified by how they share information among the processors. Shared-memory multiprocessor computers offer a common memory address space that all processors can access. Processes within a program communicate through shared variables in memory that allow them to read or write to the same memory location in the computer. Message passing multiprocessor computers, on the other hand, have a separate memory space for each processor. Processes communicate through messages to each other.

Shared-memory multiprocessor computers may also be classified by how the memory is physically organized. In distributed shared-memory computers, the memory is divided into modules physically placed near a group of processors. Although all of the memory modules are globally accessible, a processor can access memory placed nearby faster than memory placed remotely. Because the memory access time differs based on memory location, distributed shared-memory systems are often called non-uniform memory access (NUMA) machines. By contrast, in centralized shared-memory computers, the memory is physically in just one location. Such centralized shared-memory computers are called uniform memory access (UMA) machines because the memory is equidistant in time and space from each of the processors. Both forms of memory organization typically use high-speed cache memory in conjunction with main memory to reduce execution time.

Multiprocessor computers with distributed shared memory are often organized into nodes with one or more processors per node. The nodes interface with each other through a network by using a protocol, such as the protocol described in the Scalable Coherent Interface (SCI)(IEEE 1596). Companies, like Intel Corporation, have developed "chip sets" which may be located on each node to provide memory and I/O buses for the multiprocessor computers.

Such chip sets often have predetermined memory addresses for basic input/output systems (BIOS), interrupts, etc. The BIOS comprises the system programs for the basic input and output operations and represents the lowest level software interface to the system hardware. Typical BIOS functions include accesses to hard disk drives, timers, and graphics adapters. An example of a chip set having predetermined memory addresses is one that follows an Industry Standard Architecture (ISA) having memory addresses dedicated to particular functions, such as system BIOS, video BIOS, graphics adapters, expansion memory, etc. A chip set may also include an interrupt controller that has a fixed range of addresses. An example of an interrupt controller is the Advanced Programmable Interrupt Controller (APIC) developed by Intel Corporation.

When a multiprocessor computer system is first powered on or otherwise reset, the processors in the system are initialized by setting them to a known state. The reset causes a processor to jump to the system BIOS to begin code execution. The BIOS brings the system through an initialization procedure (also called booting) whereby diagnostic routines are run on the system hardware, such as memory and the processors. After the initialization procedure is complete, an operating system is loaded onto the computer system. The operating system includes a program that performs a number of tasks central to the computer's operation including managing memory, files and peripheral devices, launching application programs, and allocating system resources.

There are several problems associated with initializing a shared-memory, multinode computer system. For example, it is desirable to use standard BIOS routines, rather than developing BIOS particular to the multinode environment. However, the standard BIOS routines are designed for a single-node environment and initialize hardware components on a node to predetermined addresses in conformance with the single-node environment. Consequently, when each node separately executes its BIOS, it sets hardware components to the same predetermined addresses as other nodes are setting their hardware components to. In such a situation, the nodes are said to have "overlapping" memory addresses because a memory location on one node has the same physical address as a memory location on another node. However, in a shared-memory, multiprocessor system each memory location needs to have a unique address so that the system can differentiate one memory location from another.

Another problem associated with the initialization of a multinode, shared-memory computer system is limiting a potential point of failure. For example, in a single or multinode environment, typically one processor in the system is given control of the booting process. This processor (often called the "centralized boot processor") brings each of the other processors in the system through a separate initialization procedure. Having a centralized boot processor is a favored architecture because it is easier to implement than coordinating multiple boot processors running separate initialization routines on each node. However, the centralized boot processor represents a potential single point of failure. That is, if the centralized boot processor fails for any reason, the entire system fails, even though other processors in the system are properly operating. additionally, having a centralized boot processor substantially slows the system initialization, since each processor is separately initialized in series.

An objective of the invention, therefore, is to provide in a shared-memory, multinode computer system, an initialization procedure that substantially eliminates a potential, single point of failure. A further objective of the invention is to provide such a shared-memory, multinode computer system that utilizes chip sets available for single-node computer systems. Still a further objective is to provide such a system that uses the well-established, PC-based BIOS for initialization.

SUMMARY OF THE INVENTION

The present invention provides an improved initialization procedure for a shared-memory, multinode multiprocessor system. The invention also takes advantage of standard hardware and software used in PC-based computers, such as commercially used chip sets and BIOS. Using the initialization procedure, a potential single point of failure is substantially eliminated making the system start-up more reliable.

In one aspect of the invention, the initialization procedure allows each node to be separately and independently initialized using standard BIOS designed for single-node environments, such as PC-based BIOS. The BIOS sets addresses to predetermined values based on a single-node environment. After the initialization is complete, each node performs additional initialization particular to the multinode environment. For example, based on a node identification, each node re-programs the addresses set by the BIOS to addresses that conform to the multinode environment. This allows the addresses of chip sets and other standard hardware components to be unique in the system.

In another aspect of the invention, after the BIOS are complete on each node, a master processor called the operating system loader monitors each node to determine which nodes have finished initialization. A system configuration table is built by the master processor that indicates the nodes on the system that are online. After all of the nodes have completed initialization, the master processor loads and executes the operating system.

The initialization procedure is very reliable because each node runs its own initialization independently. Thus, if one node fails for any reason, the entire system is not prevented from starting up. Additionally, the initialization is faster because the nodes execute their initialization routines in parallel. Although the master processor may be considered a single point of failure, it only plays a small part (i.e., loading the operating system) late in the initialization procedure. Accordingly, the diagnostics on the nodes are completed before the master processor is selected.

The foregoing and other objects, features, and advantages of the invention will become more apparent from the following detailed description of a preferred embodiment which proceeds with reference to the following drawings.

BRIEF DESCRIPTION OF THE DRAWINGS

FIG. 8 is a flow chart of a method for booting an operating system on the multinode system of FIG. 1.

DETAILED DESCRIPTION OF A PREFERRED EMBODIMENT

System Overview

Figure 1:
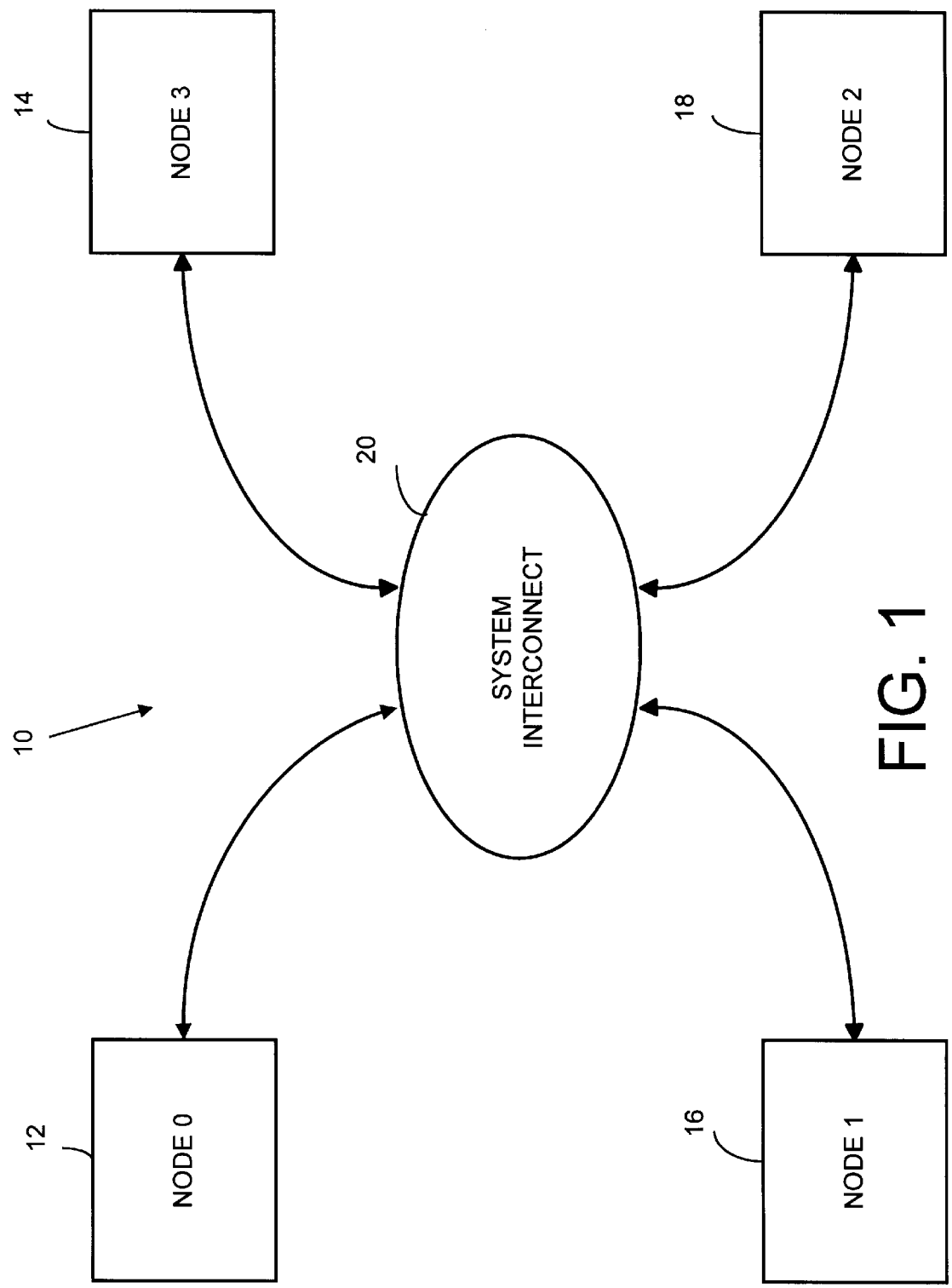
FIG. 1 is a block diagram of a multinode, multiprocessor computer system with a system interconnect coupling the nodes together in accordance with the invention.

FIG. 1 is a block diagram of a multinode, multiprocessor computer system 10 in accordance with the invention. System 10 uses a computer architecture based on Distributed-Shared Memory (DSM). Four nodes 12–18 are shown connected by a system interconnect 20 (i.e., a network) that permits any node to communicate with any other node. Specifically, the purpose of system interconnect 20 is to allow processors in any node to access the memory resident in any other node with cache coherency guaranteed. System interconnect 20 is a switch-based network that uses the Scalable Coherent Interface (SCI) interconnection mechanism. SCI is an IEEE-approved standard, or protocol (1596), well documented in a number of publications including *IEEE Std* 1596–1992 (Aug. 2, 1993) and *Multiprocessor Interconnection Using SCI,* a Master Thesis by Ivan Tving, DTH ID-E 579 (1994), both of which are hereby incorporated by reference.

The physical links of interconnect 20 provide high bandwidth and low latency and are scalable to allow for the addition of more nodes. Links that meet these requirements include point-to-point interconnects with a data throughput of one gigabyte/second or greater. The links can be configured in any number of suitable ways for connecting nodes 12–18, such as in a ring topology, in arbitrary topologies through switches, or in a combination of both. The links can be wired or wireless (optical, RF, etc.) depending upon system performance needs. Additional topologies are described in "Interconnect Topologies with Point-To-Point Rings," Ross E. Johnson and James E. Goodman, December 1991, *Computer Sciences Technical Report* #1058, University of Wisconsin-Madison.

Node Overview

Figure 2:
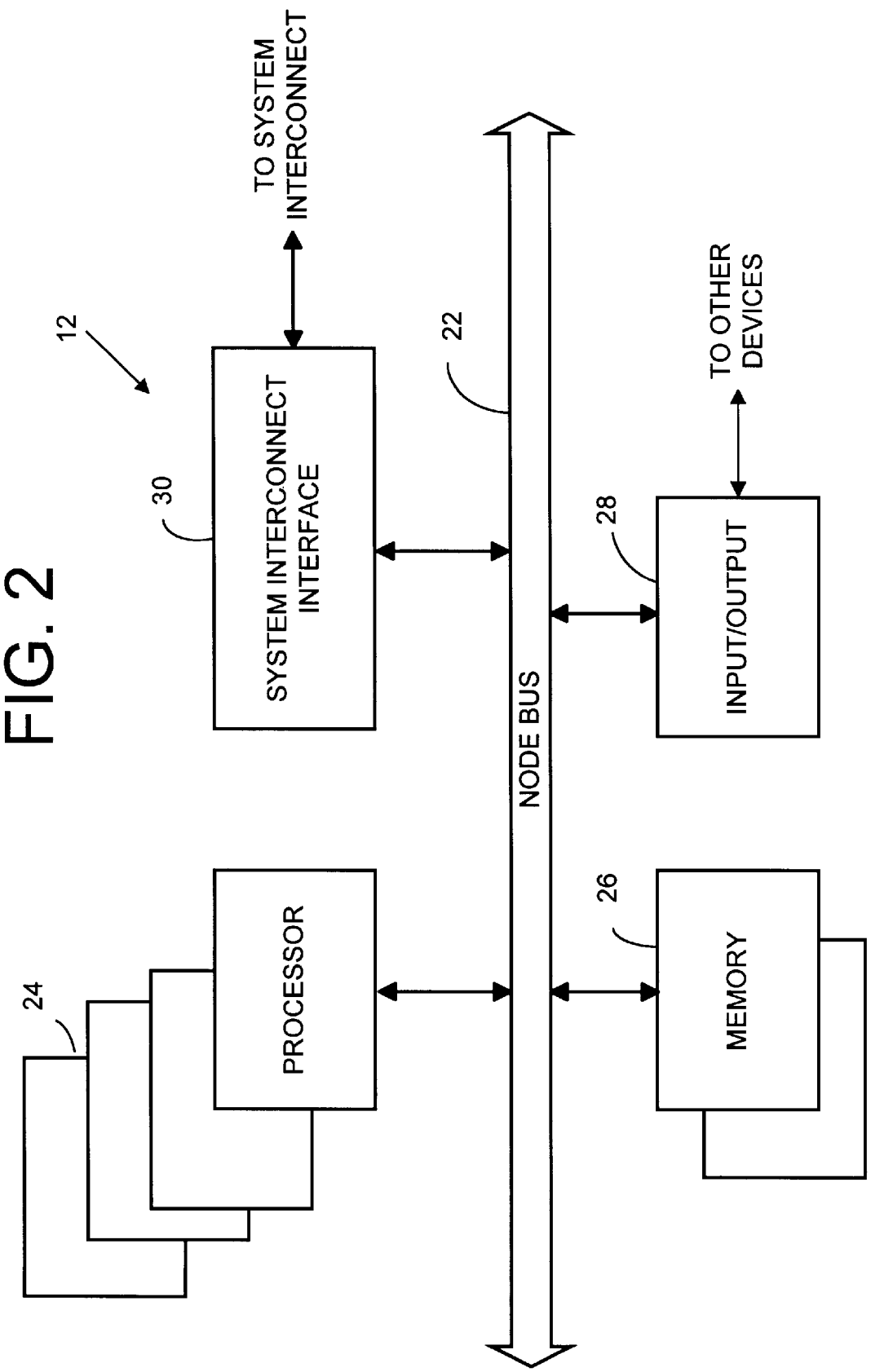
FIG. 2 is a block diagram of one of the nodes of the computer system of FIG. 1.

A block diagram of node 12 of system 10 is shown in FIG. 2. The node includes a conventional symmetrical multiprocessor (SMP) node bus 22 (e.g., a P6 bus) for connecting multiple data processors 24 to local memory 26. The processors are Pentium® Pro processors but other processors can be used. For clarity, nodes 12–18 may be referred to as home nodes or remote nodes in certain circumstances. A home node is one whose local memory stores a memory block of interest (i.e., the address of the memory block falls within the address range supported by the local memory or cache); all of the other nodes are then remote nodes with respect to that memory block. Additionally, a node may be a requesting node or a responding node. A requesting node is one requesting data; a responding node is one furnishing such data. Input/output (I/O) 28, which is also connected to bus 22, connects the node to devices outside computer system 10 for communicating information between the computer system and the outside world. I/O may be of conventional design and includes means for connecting the node (and hence system 10) to personal computers, local area networks, etc., that wish to utilize the power of the multinode computer system. I/O 28 and memory 26 may be coupled to the node bus 22 by using standard chip sets (not shown), such as the 82450 PCI chip set developed by Intel Corporation. The 82450 chip set provides a bridge to one or more PCI buses (not shown) and memory 26. Other standard buses may also exist on the system, such as ISA, EISA, MCA, and VL.

To connect node 12 to the other nodes in the system, the node includes a system interconnect interface 30. The system interconnect interface 30 forms part of interconnect 20 along with the physical links between nodes and the same devices on the other nodes of the computer system 10. In the present embodiment, interface 30 is constructed to implement the SCI standard for data communication between the nodes, allowing a processor on one node to access data stored on another node. The interface 30 also contains a remote cache in the present embodiment, although this combination is not required for the invention.

System Interconnect Interface Overview

Figure 3:
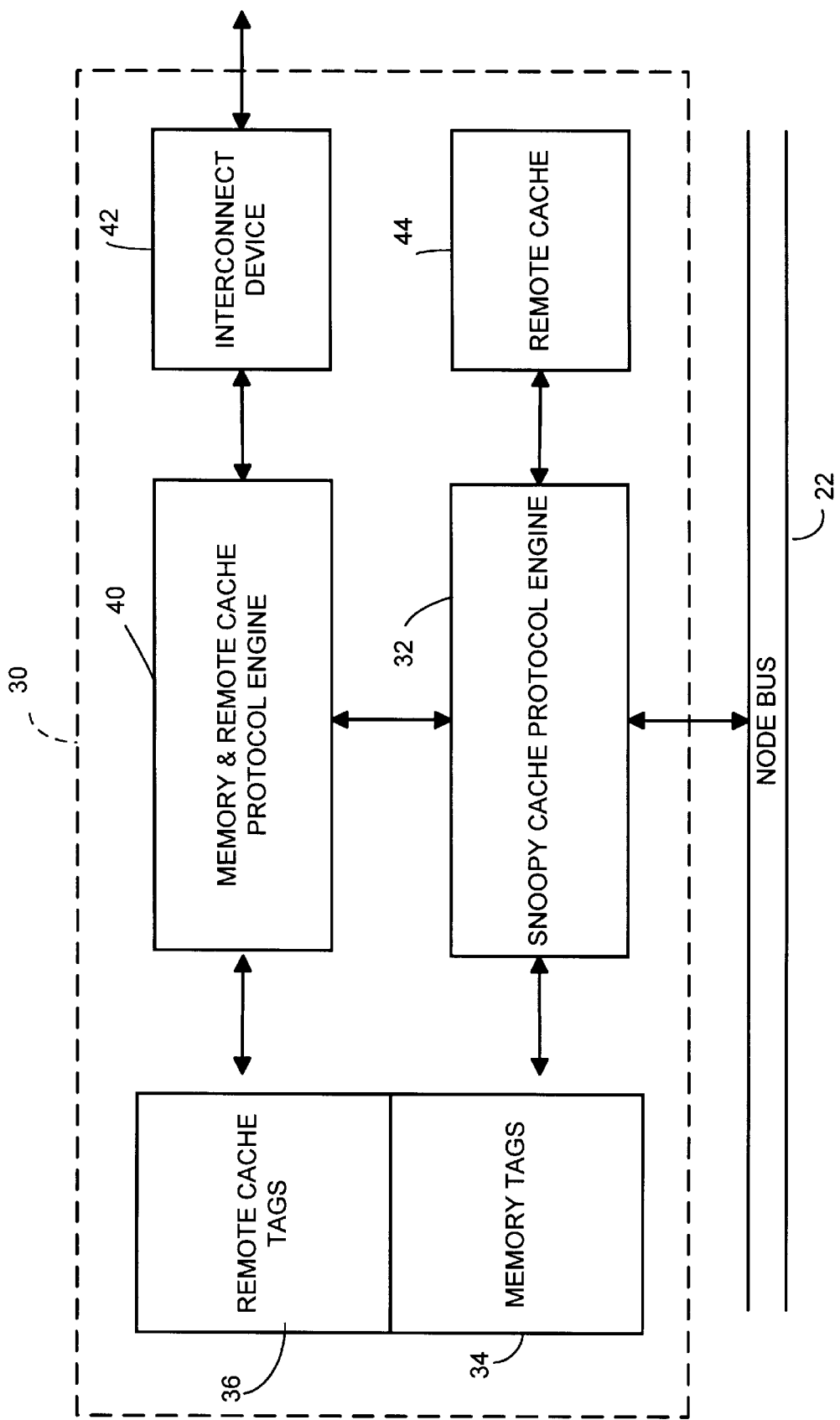
FIG. 3 is a block diagram of a system interconnect interface within the node of FIG. 2.

FIG. 3 is a block diagram showing the system interconnect interface 30 in more detail. System interconnect interface 30 interfaces the caches and memory on local node bus 22 with caches and memories on remote nodes. A directory-based cache protocol based on SCI is used to manage the coherency of the local and remote caches. Interface 30 includes a snoopy cache protocol engine 32, storage for memory tags and remote cache tags 34 and 36, a memory and remote cache protocol engine 40, an interconnect device 42, and a remote cache 44.

Snoopy cache protocol engine 32 provides an interface to node bus 22 by monitoring (also called "snooping") node bus 22 to see if there are any requests on the bus that protocol engine 32 needs to act on or respond to.

Memory and remote cache protocol engine 40 manages the SCI protocol and may include one or more protocol engines. The protocol engine is a three-stage pipelined processor, but other types of protocol engines may be used.

Interconnect device 42 (also called a "data pump") provides a link and packet level interface to the SCI ring. The interconnect device puts SCI packets onto system interconnect 20, bypasses SCI packets targeted for other nodes, and strips SCI packets from the system interconnect that are targeted for the node that interconnect device 42 is located on. Interconnect device 42 is a chip developed by Vitesse Semiconductor Corporation, but other interconnect devices may be used.

Remote cache 44 is used to store copies of memory lines fetched from remote memories on other nodes. Remote cache is 32 Mbytes and is organized as a four-way associative cache with 64 byte lines. However, the type, size and organization of remote cache 44 can be modified based on the particular application.

Initialization Problems on the Computer System

A memory map is a representation of where resources are available on computer system 10. The term "memory map" is a standard term used in the art. A memory map includes addresses of memory and other devices on the system, such as I/O devices, control registers, etc. The term "memory location" is used to refer to addresses in the memory map. Consequently, a memory location may refer to an actual memory location, a control register, etc.

The multinode system, according to the invention, utilizes standard BIOS, such as PC-based BIOS. Traditionally, these BIOS test system components, build a Multiprocessor Specification (MP) table (this table identifies the processors and other hardware components on the system), initialize processors to a known state, and provide run-time, device-oriented services.

The standard BIOS are designed for a single-node environment. In order to utilize these standard BIOS, the multinode system allows each node to be initialized, to some extent, as though each node is operating within a single-node environment. As a result, hardware components (e.g., PCI bridges, memory controllers, etc.) are set to the same predetermined addresses on each node. In such a situation, the addresses are said to be "overlapping" between nodes because a memory location on one node has the same physical address as a memory location on another node. However, in a shared memory system, such as exists in the multinode environment of the present invention, each memory location needs to have a unique address so that the system can differentiate one memory location from another.

Initialization Overview for a Multinode Environment

Figure 4:
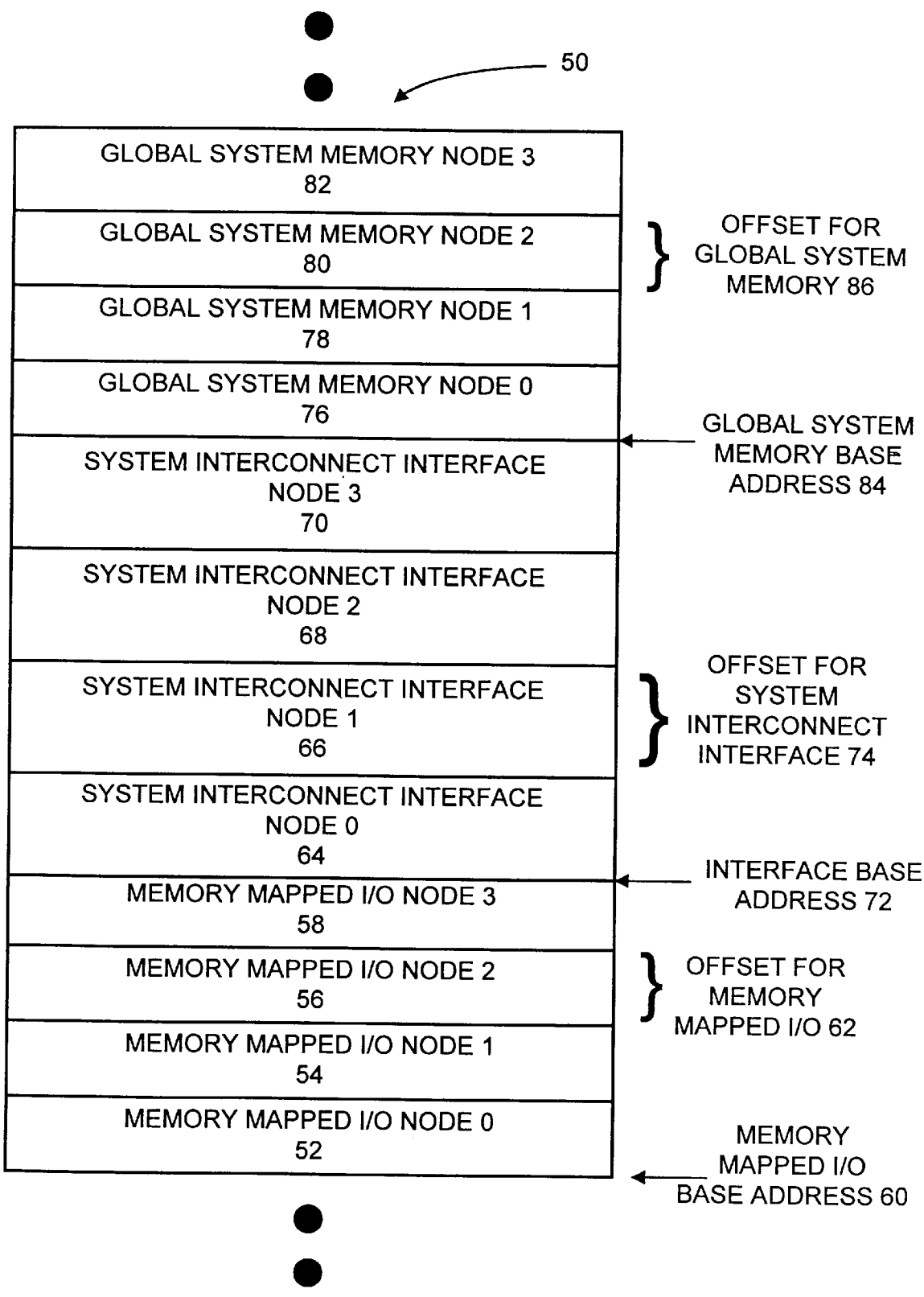
FIG. 4 is a memory map for the multinode environment of FIG. 1.

FIG. 4 shows a portion of a desired system memory map 50 for the multinode computer system 10. The memory map has lower addresses at the bottom and higher addresses at the top for purposes of illustration. To avoid overlapping memory mapped I/O addresses between nodes, each node has a unique memory mapped I/O region 52, 54, 56 or 58. The memory mapped I/O regions include hardware components initialized by the BIOS, such as interrupt controllers, memory controllers, and devices associated with the PCI bus (not shown). The memory mapped I/O regions have unique address ranges that start at a memory mapped I/O base address 60 and are spaced apart a distance determined by an offset 62. As discussed further below, the unique memory map regions 52, 54, 56, and 58 are the result of an additional initialization routine that is run after the standard BIOS. That is, the standard BIOS initialize each node to have a memory mapped I/O region that overlaps with memory mapped I/O regions on other nodes, rather than having unique addresses as shown in FIG. 4. Thus, the additional initialization routine run after the standard BIOS changes the address ranges of the memory mapped I/O regions to those shown in FIG. 4.

The memory map 50 also includes address ranges 64, 66, 68 and 70 representing addresses for system interconnect interface 30 on nodes 0–3, respectively. Included in each of these address ranges are addresses for uniquely identifying hardware components included in the system interconnect interface 30, such as snoopy cache protocol engine 32, protocol engine 40, and interconnect device 42. The address regions 64, 66, 68, and 70 have unique address ranges that start at a base address 72 and are spaced apart a distance determined by offset 74.

The memory map 50 also includes address ranges 76, 78, 80, and 82 for global system memory for nodes 0–3. The global system memory address ranges 76, 78, 80, and 82 allow the multiprocessor computer system 10 to uniquely identify memory on each node, such as memory 26 on node 12. The global system memory address ranges start at a base address 84 and are spaced apart a distance determined by offset 86. Other memory regions exist in the memory map, but are not shown because they are not relevant to the invention. Additionally, the particular memory structure and organization are not important to the invention.

Figure 5:
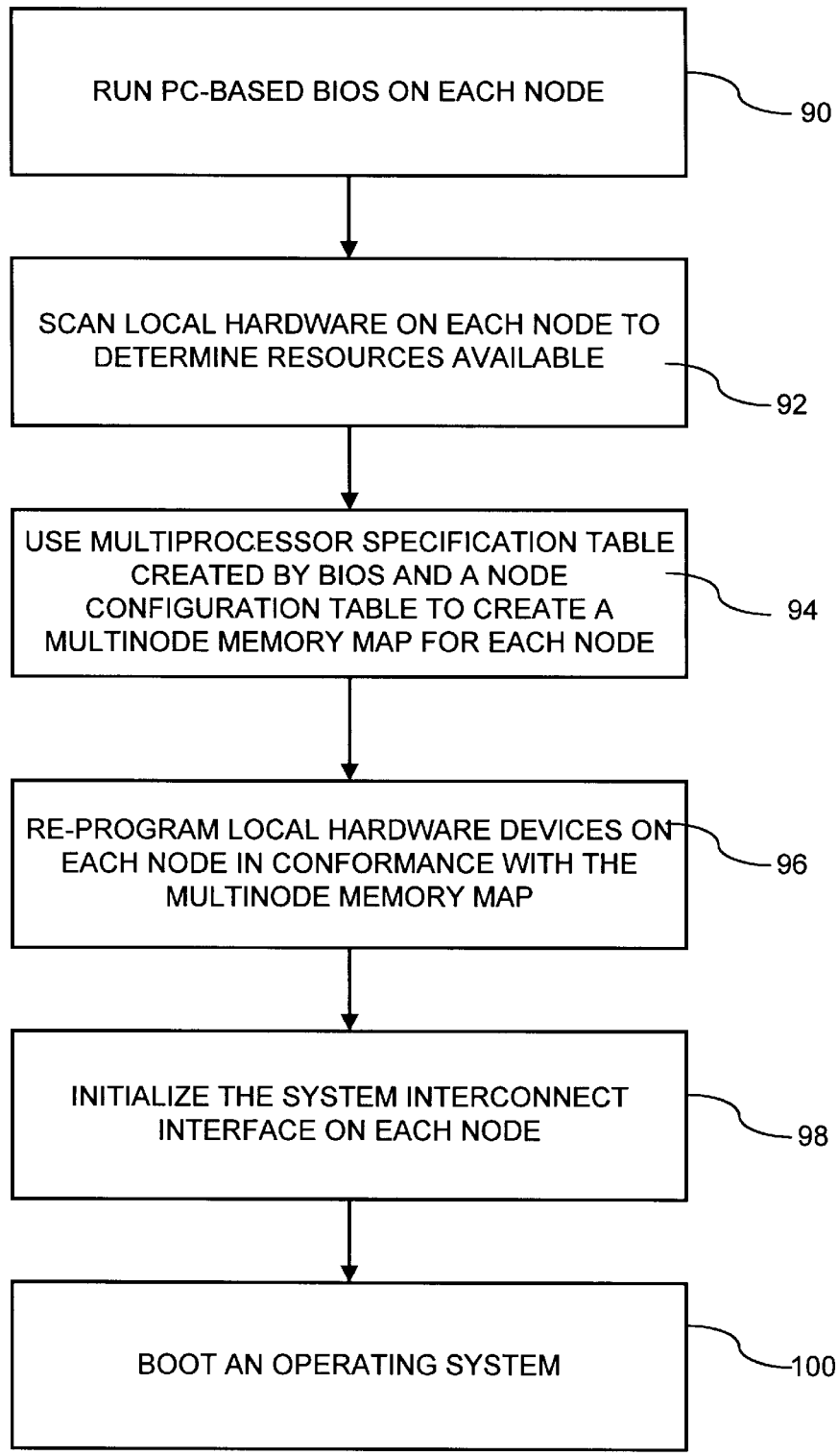
FIG. 5 is a flow chart of a method in accordance with the invention for initializing the multinode system of FIG. 1.

FIG. 5 shows a flow chart 88 of a method according to the invention for initializing the multinode system 10. The initialization method utilizes standard, PC-based BIOS that have been developed for single-node systems. The initialization procedure begins after a "hard" or a "soft" reset. A hard reset is the result of a reset signal that is sent to most devices in the system 10 during power-on or as the result of activation of a reset button. A soft reset is a reset initiated by software and does not fully initialize the hardware.

In step 90, the standard PC-based BIOS are executed independently and in parallel on each node upon a hard or soft reset. In the preferred embodiment, the BIOS on each node are run in conformance with the Multiprocessor Specification version 1.4, developed by Intel Corporation, which is hereby incorporated by reference. The Multiprocessor Specification can be readily found on Intel's web site. Other currently available or future standards can be used instead. Under Multiprocessor Specification version 1.4, each node is assigned a bootstrap processor (BSP). The other processors on the node are called application processors (AP). The BSP on each node is responsible for initializing the hardware components on its node by running BIOS stored on that node. A BSP in a single-node environment traditionally is also responsible for booting the operating system. In the present embodiment, however, the BSPs are not given this responsibility. Instead, a single processor on the system 10 called the operating system loader (also called the master processor) is given the responsibility of loading an operating system for system 10 after the BIOS are complete on all of the nodes. The operating system loader is one of the processors 24 on node 12 but any processor on any node may perform this task. This operating system loader may be chosen in a number of ways. First, the operating system loader (i.e., master processor) may be a predetermined processor fixed in software or hardware. Second, a user may initialize which processor is the operating system loader through a user console (not shown) coupled to the computer system 10. Third, the operating system loader may be determined during or after initialization. For example, the operating system loader may be chosen by software after initialization based on which processors or nodes passed initialization. This further reduces a single point of failure. The operating system loader is further described below with reference to FIG. 8.

During initialization, an MP table is built by the BIOS on each node. The MP table contains configuration information about interrupt controllers, processors, buses, and interrupts available on the node. The MP table is stored in system RAM or some other secondary storage medium (e.g., disk drive) on computer system 10. Part of the configuration information stored in the MP table includes memory addresses for hardware components located on a node. For example, the MP table may identify the kinds of buses in the system and the addresses that are mapped to the buses.

In step 92, the local hardware components are scanned on each node. Many of these hardware components are not initialized by the BIOS in step 90 because they are not standard PC-based devices. Instead, these devices are particularly designed for a multinode environment. For example, system interconnect interface 30 includes snoopy cache protocol engine 32, memory and remote cache protocol engine 40, and interconnect device 42, all of which need to be initialized after the PC-based BIOS are completed. In the preferred embodiment, these hardware components are initialized by a scan controller (not shown) separately located on each node. Scan controllers (also called boundary scan logic) are well known in the art and include a serial bus (not shown) that allows communication with the hardware components on system interconnect interface 30. Using the serial bus, the scan controller can initialize the devices on system interconnect interface 30. Part of the initialization routine is to set the addresses of these parts so that processors 24 can communicate with them over node bus 22. The scan controller on each node begins its initialization procedure after the BIOS are completed through the control of the BSP. Other initialization techniques, other than a scan controller, may of course be used.

In step 94, the BSP on each node independently uses the MP table and a node-configuration table to create a multinode memory map. The node-configuration table is a data structure that contains a node identification for each node (e.g., 0 for node 0, 1 for node 1, etc.) and various memory bases and offsets, shown in FIG. 4. A sample node configuration table is as follows:
    struct node_cfg_table {
        unsigned int node_id;
        unsigned int high_mem_sys_base;
        unsigned int high_mem_sys_offset;
        unsigned int mmio_offset}

The node configuration table does not need to be a structure as shown. It also can be hardcoded, stored in RAM, or stored on any secondary storage mechanism on computer system 10. The node configuration may also be set or changed by a user console (not shown) coupled to computer system 10.

The node_id field is for the node identification number associated with the node. The high_mem_sys_base field indicates where base 84 (FIG. 4) of global system memory is located. The high_mem_sys_offset field indicates global memory offset 86 for each node. These fields could be hard coded as constants if desired, rather than included in the configuration table. Additionally, other fields can be used. Using these fields, each node can determine the starting address of memory 26 on its node and other nodes in the system. Thus, for global system memory, a memory map for the multinode environment can be formed. Further details of the method used to conform the global system memory to the multinode environment are described in relation to FIG. 6.

The mmio_offset field indicates offset 62 for the memory mapped I/O regions 52, 54, 56, and 58. The memory mapped I/O region includes all of the hardware components initialized by the system BIOS, such as interrupt controllers, memory controllers, and components associated with the PCI bus (not shown). These hardware components have already been initialized by the BIOS to predetermined memory addresses, but must be re-programmed in conformance with the multinode memory map 50. Further details of the method used to conform the memory mapped I/O regions to the multinode environment are described in relation to FIG. 7.

In step 96, the local hardware devices associated with the memory mapped I/O regions 52, 54, 56, and 58 are re-programmed in conformance with the memory map for the multinode environment 50. Those skilled in the art will recognize how to re-program PC-based hardware. In the preferred embodiment, the re-programming is performed in conformance with PCI Local Bus Specification 2.1, an industry standard developed by Intel corporation. The PCI Local Bus Specification 2.1 is hereby incorporated by reference and is readily available from Intel Corporation. Other standards for re-programming PC-based hardware will undoubtedly be developed in the future and can be used in place of PCI Local Bus Specification 2.1.

In step 98, system interconnect interface 30 is assigned addresses in conformance with the multinode memory map 50 as shown at 64, 66, 68, and 70 (FIG. 4). The BSP calculates new addresses for the hardware components on system interconnect interface 30. This is accomplished by reading the node_id field from the node-configuration table and multiplying it by the predetermined offset 74 (FIG. 4). The result is added to the predetermined base address 72 to provide the starting addresses for the hardware components within the interface 30. Each hardware component is then re-programmed using the starting addresses.

In step 100, an operating system loader processor is assigned on one of the nodes and boots the operating system. Details on the operating system booting process are further described below with reference to FIG. 8.

Configuring Global System Memory

Figure 6:
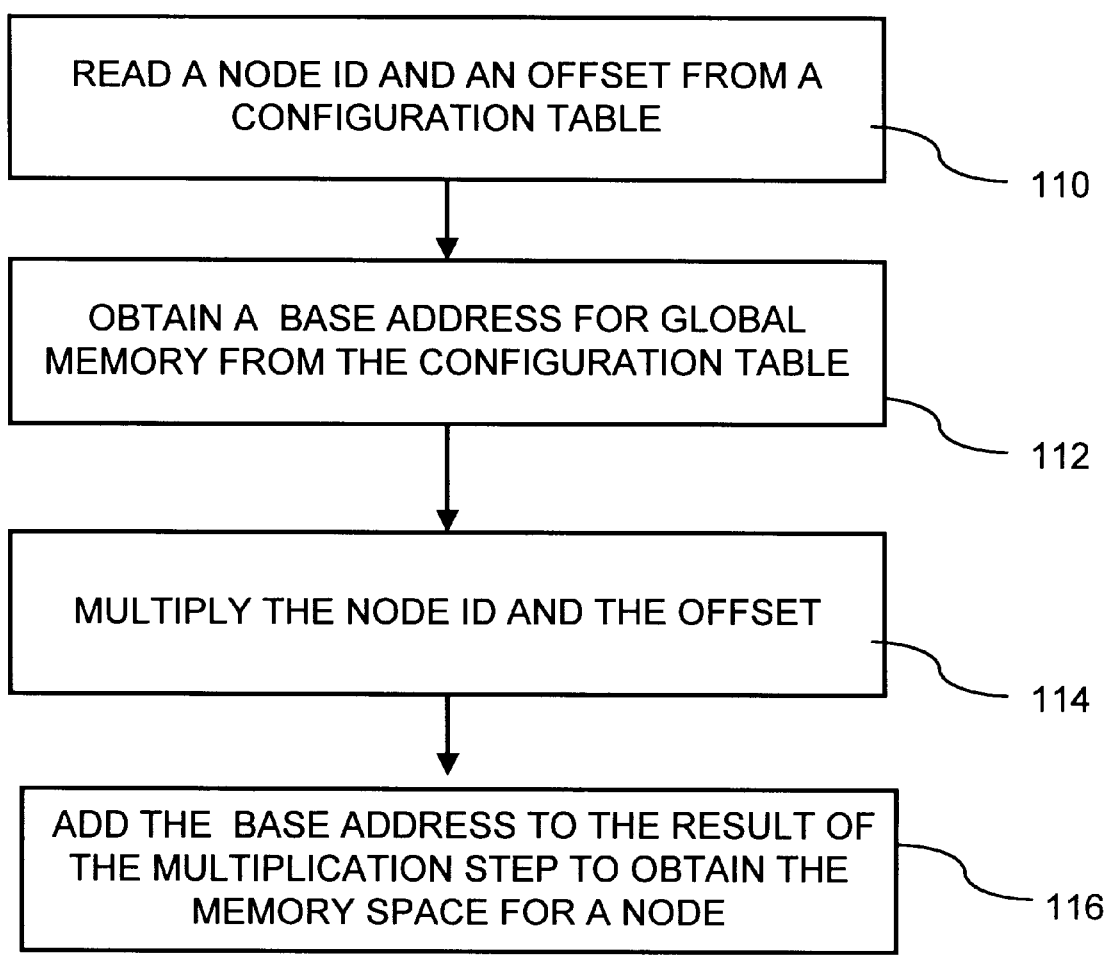
FIG. 6 is a flow chart of a method for setting global system memory addresses according to the memory map of FIG. 4.

FIG. 6 shows a flow chart 108 of a method for calculating the location of global system memory on each node. Each node's memory 26 is given an address range that is unique so that the memory locations can be differentiated between nodes. For example, FIG. 4 shows global system memory for nodes 0–3 as address ranges 76, 78, 80, and 82, respectively. The positioning of the memory addresses is based on offset 86, the node identification, and base address 84 available from the node-configuration table.

Step 110 shows that the node identification (i.e., node_id) and memory offset 86 (i.e., high_mem_sys_offset) are read from the node configuration table.

In step 112, a base address 84 (i.e., high_mem_sys_base) is obtained from the node-configuration table. The base address and offset may be variables in the node configuration table or constants. In step 114, the node identification and offset 86 are multiplied together and in step 116 this result is added to base address 84. This gives a unique address range for each node in the multinode memory map 50 of FIG. 4.

Configuring Memory Mapped I/O

Figure 7:
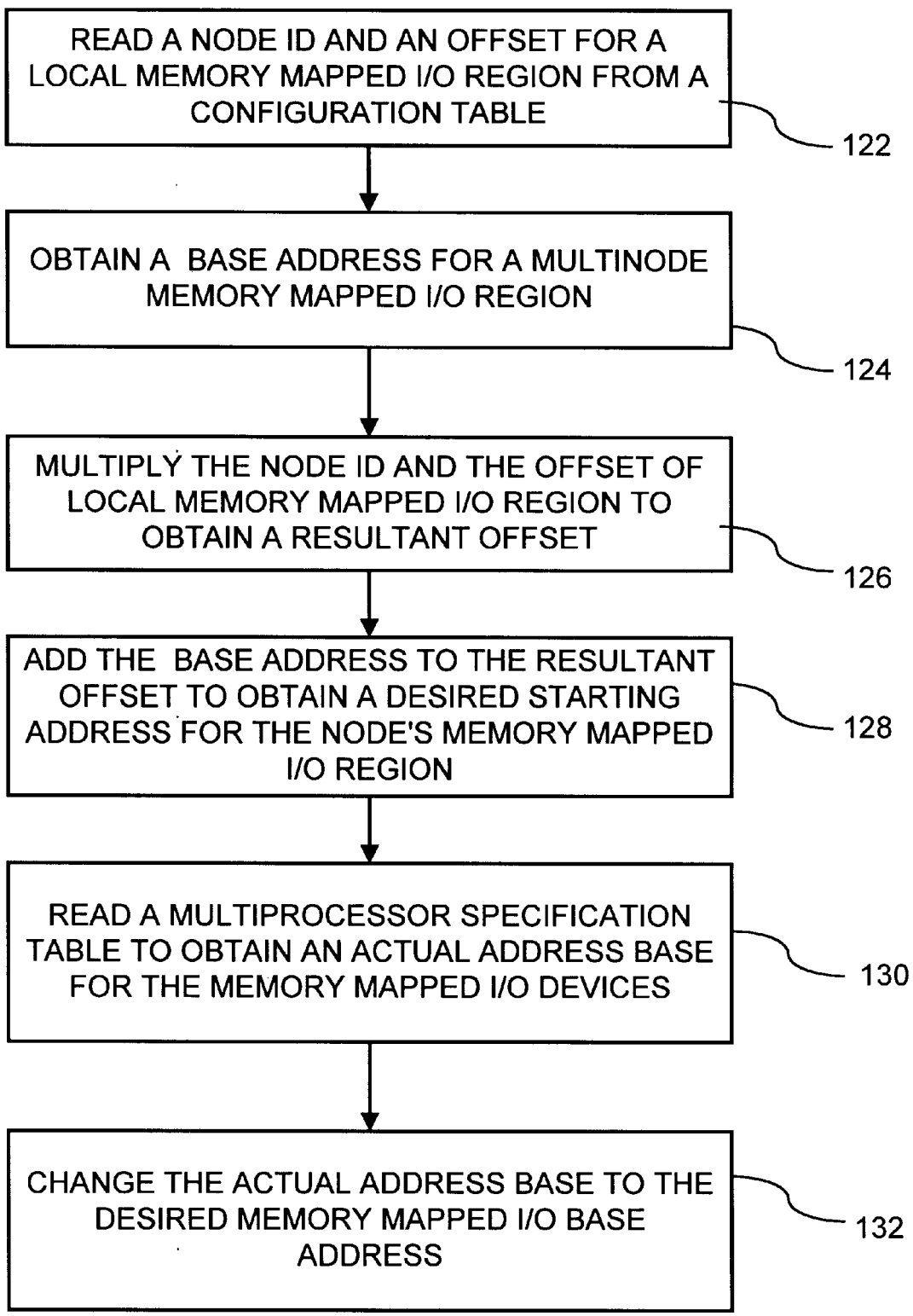
FIG. 7 is a flow chart of a method for setting memory mapped I/O addresses according to the memory map of FIG. 4.

FIG. 7 shows a flow chart 120 of a method for initializing the memory mapped I/O address regions 52, 54, 56, and 58 for nodes 0–3, respectively.

In step 122, the node identification and offset 62 (i.e., mmio_offset) are obtained from the node configuration table.

In step 124, a base address 60 (FIG. 4) is obtained for the memory mapped I/O region. In the illustrated embodiment, the base address 60 is not listed in the node configuration table, but is a constant. Of course, it could be included in the node configuration table if desired.

In step 126, the node identification and offset 62 are multiplied together. In step 128, the result of the multiplication step 126 is added to the base address 60 to provide the starting address for each node's memory mapped I/O address region. For example, node 0 calculates the starting address of region 52 (FIG. 4), while node 1 calculates the starting address of region 54, etc.

In step 130, the BSP on each node reads the MP table to obtain the actual base address of memory mapped I/O devices initialized by the BIOS. The base address is a starting address of where the memory mapped I/O devices are currently located. Details of how to obtain this actual base address can be found in the Multiprocessor Specification version 1.4.

In step 132, the actual base address found in the MP table is changed to the starting addresses calculated in step 128. After changing the MP table, the address registers on the memory mapped I/O components are changed in conformance with the memory map of FIG. 4 and the MP table. As described above, the re-programming is accomplished by writing the address registers of the hardware components in conformance with PCI Local Bus Specification 2.1. Thus, the MP table and the hardware components have been changed to conform to the multinode memory map 50 of FIG. 4.

Booting an Operating System

FIG. 8 shows a flow chart of a method for booting an operating system on the multinode environment. After each node has run its individual BIOS and has programmed its hardware in conformance with the memory map of FIG. 4, the BSP on each node sets a flag (step 142) located in memory 26 or on the system interconnect interface 30 indicating that the node has completed initialization.

In step 144, an operating system loader or master processor is assigned to control the final system initialization. Assigning control to the operating system loader is accomplished by a number of means described above. For example, a user may be able to set which processor is the operating system loader through a user console (not shown). Alternatively, the operating system loader may be predetermined in software or set by software based on which processors passed initialization. Up until this point, each node has been running independently as if each node is a single-node, PC-based system. The operating system loader is one processor in the system (typically on node 0) that is responsible for bringing all of the nodes into a multinode environment.

In step 146, the operating system loader builds a table (called the system configuration table) that is eventually passed to the operating system. This table indicates what nodes are available on the system and provides a pointer to the MP table. To build this table, the operating system loader probes each node using messages passed through interconnect device 42 to see what nodes have set their flag indicating initialization is complete. Each node that has completed initialization is added to the table. Additionally, the operating system loader obtains the MP tables from each node and collapses them into one global MP table that conforms to Multiprocessor Specification version 1.4. The global MP table defines addresses of hardware located on each node.

In step 148, the operating system loader loads the operating system from a disk drive (not shown) or other secondary storage medium and begins execution of the operating system. The operating system has access to the MP table to know where hardware devices are located in the system. Additionally, some operating systems use the system configuration table to determine the nodes that are online.

Having illustrated and described the principles of the invention in a preferred embodiment, it should be apparent to those skilled in the art that the embodiment can be modified in arrangement and detail without departing from such principles.

For example, although the invention is described in terms of particular hardware and software used, the hardware can be replaced by software and vice versa.

Furthermore, although four nodes are shown, the invention is applicable to systems including any number of nodes in a multinode system.

Still further, although the invention is described with reference to PC-based BIOS, other single-node BIOS commercially available may be used.

In view of the many possible embodiments to which the principles or invention may be applied, it should be recognized that the illustrated embodiment is only a preferred example of the invention and should not be taken as a limitation on the scope of the invention. Rather, the invention is defined by the following claims. We therefore claim as the invention all such embodiments that come within the scope of these claims.

We claim:

1. In a multiprocessor computer system having a shared memory distributed among multiple nodes, a method of initializing the computer system, the method comprising the following steps:

initializing a node using BIOS for a single-node environment so that addresses of hardware components on the node conform to a single-node memory map;

after the BIOS are complete, re-programming the addresses of the hardware components on the node to conform to a multinode memory map; and booting an operating system that runs in conformance with the multinode memory map.

2. The method of claim 1 wherein the initializing step includes building a multiprocessor specification table that defines addresses of the hardware components on the multiprocessor computer system.

3. The method of claim 1 wherein the re-programming step includes obtaining a node identification for the node and calculating addresses conforming to the multinode memory map using the node identification.

4. The method of claim 1 wherein the re-programming step includes obtaining a node identification, an offset, and a base address and adding the base address to the product of the node identification and the offset to obtain a resultant address conforming to the multinode memory map.

5. The method of claim 1 wherein the hardware components include a PCI bridge and memory controller located on the node.

6. The method of claim 1 further including setting an initialization flag indicating that the node has completed local initialization.

7. The method of claim 1 wherein the booting step includes copying the operating system into memory on the computer system and executing the operating system.

8. The method of claim 1 wherein the initializing and reprogramming steps are applied to more than one node of the computer system.

9. A computer-readable medium on which is stored instructions for executing the steps of claim 1.

10. The method of claim 2 further including updating the multiprocessor specification table to conform with the multinode memory map.

11. The method of claim 4 further including writing the resultant address to an address control register of a hardware component on the node.

12. The method of claim 6 further including assigning one of the processors on a node in the multiprocessor computer system to read each node's initialization flag to determine if initialization of all the nodes is complete.

13. The method of claim 12 further including building a system configuration data structure that indicates whether the nodes have completed initialization.

14. In a multiprocessor computer system having a shared memory distributed among multiple nodes, a method of initializing the computer system, the method comprising the following steps:

upon power up or restart of the computer system, running a PC-based BIOS routine independently and in parallel on each node;

upon completion of the BIOS routine, re-programming addresses of hardware components on a node to conform to a multinode memory map and setting a flag in memory indicating initialization is complete for that node;

assigning a master processor that controls booting the operating system after the BIOS on each node is complete; and loading and executing the operating system using the master processor.

15. The method of claim 14 further including setting address registers for hardware components according to a single-node memory map.

16. The method of claim 15 further including re-programming the address registers in conformance with a multinode memory map after the PC-based BIOS are complete.

17. A multiprocessor computer system with shared memory distributed among multiple nodes, comprising:

a first node including one or more processors, a local bus and a snoopy cache protocol engine for monitoring requests on the local bus, the first node being initialized by a first BIOS routine stored locally on the first node;

a second node coupled to the first node, the second node including one or more processors, a local bus and a snoopy cache protocol engine for monitoring requests on the local bus, the second node being Initialized by a second BIOS routine stored locally on the second node and running in parallel with the first BIOS routine;

a processor on each of the first and second nodes that re-programs addresses on the nodes to conform to a multinode memory map;

a system interconnect coupling the first node to the second node; and a master processor on one of the multiple nodes in the computer system for monitoring the first and second nodes and for booting an operating system on the multiprocessor system upon the completion of initialization of the first and second nodes by the BIOS routines on the first and second nodes.

18. The computer system of claim 17 wherein the computer system includes at least two nodes.

19. In a multiprocessor computer system having a shared memory distributed among multiple nodes, a method of initializing the computer system, the method comprising the following steps:

initializing a node to a first local address layout In conformance with a single-node memory map;

re-programming the first local address layout to conform to a multinode memory map as follows:
   obtaining a node identification.;
   obtaining a memory offset based on a multinode memory map;
   obtaining a base address for the multinode memory map; and
   calculating a second local address layout by adding the base address to the product of the node identification and the memory offset.

20. In a multiprocessor computer system having a shared memory distributed among multiple nodes, a method of initializing the computer system, the method comprising:

initializing at least two nodes in parallel using BIOS for a single-node environment so that addresses of hardware components on each node conform to a single-node memory map for the node; and after the BIOSes are complete, re-programming the addresses of the hardware components on each node to conform to a multinode memory map for the computer system.

* * * * *